March 10, 1953 C. O. MARSH, JR 2,631,230

CIRCUIT FOR MINIMIZING THE EFFECTS
OF NOISE IN TELEVISION SIGNALS
Filed Oct. 11, 1949

INVENTOR.
CLEE O. MARSH JR.
BY Darby & Darby
Attorneys

Patented Mar. 10, 1953 2,631,230

UNITED STATES PATENT OFFICE 2,631,230

CIRCUIT FOR MINIMIZING THE EFFECTS OF NOISE IN TELEVISION SIGNALS

Clee O. Marsh, Jr., Nutley, N. J., assignor to Allen B. Du Mont Laboratories, Inc., Passaic, N. J., a corporation of Delaware Application October 11, 1949, Serial No. 120,712

7 Claims. (Cl. 250—20)

This invention relates to minimizing the effects of noise in radio signals, and more particularly to the removal of noise peaks from received television signals.

In the past, large peaks of interfering noises have been removed from desired signals by clipping. For best noise reduction it is desirable that clipping occur close to the maximum excursion of the desired signal. To prevent distortion of the desired signal or removal of synchronization signals it is necessary that the clipping level does not occur within the desired signal.

An object of my invention is to provide a clipping tube and circuit in which clipping is automatically maintained at the proper level for a wide range in amplitude of the incoming signals.

Another object is to provide apparatus which in conjunction with an automatically controlled clipping tube is adapted to minimize the effects of noise impulses when they are mixed with a received television signal.

Another object is to provide a method by which the magnitude of noise mixed with a desired signal may be reduced.

In accordance with the invention, the current flowing through a gain controlled amplifier is utilized to control a clipping level. Thereafter the signal is passed through a narrow band coupling network and again clipped in a sync separating circuit.

Figures 1, 2, 3, 4, 5:
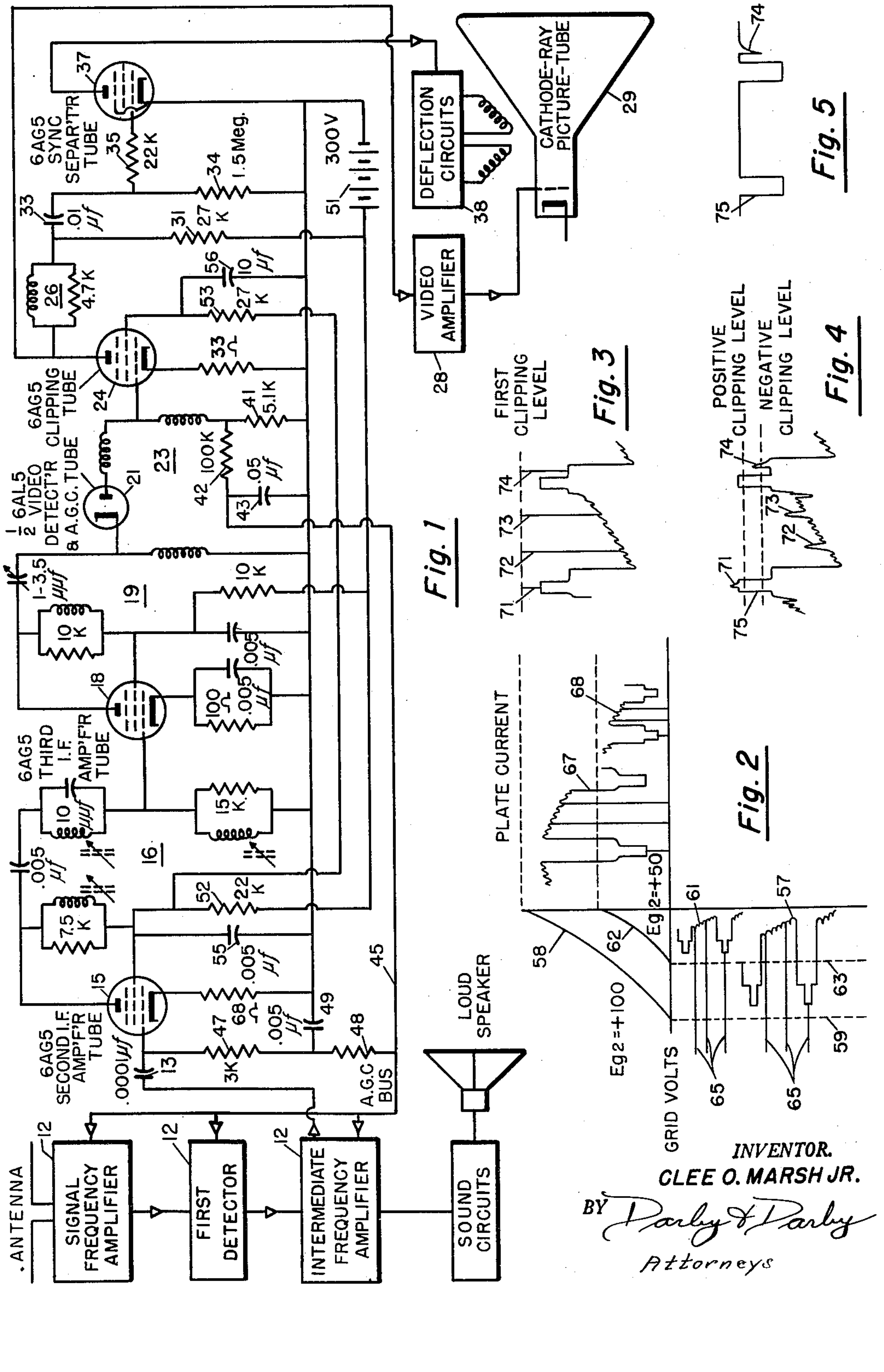
Figure 1 shows a television receiver partly in block form and partly schematic.
Figure 2 shows the mutual characteristics of a clipping tube for different applied screen voltages.
Figures 3, 4 and 5 show wave forms of voltages found within the receiver of Figure 1 plotted against a time axis.

Referring to Figure 1, amplification of a television signal occurs in the usual amplifier stages 12 shown in block form, including therein a first intermediate-frequency amplifier tube. The output signal from these stages is coupled by means of a capacitance 13 to a second intermediate-frequency amplifier tube 15. The plate of this latter tube 15 is coupled by means of an intermediate frequency band pass filter 16 to a third intermediate frequency amplifier tube 18. The plate of this third tube 18 is coupled by means of a second intermediate frequency band pass filter 19 to the cathode of a video detector tube 21. The demodulated signal from the plate of the video detector tube 21 is directly coupled through a video frequency filter 23 to the input electrode of a clipping tube 24. The plate or output electrode of the clipping tube 24 is coupled to a video filter 26 and to a video amplifier 28 of the usual type. The output of the video amplifier 28 is connected to a beam intensity controlling electrode of a cathode ray picture tube 29. A load resistor 31 connected to the video filter 26 provides a load for synchronization signals obtained through the plate circuit of the clipping tube 24. A coupling capacitor 33 connects the load resistor 31 to a grid leak resistor 34 and a series resistor 35, the latter resistor being connected to the grid of a synchronization signal separator tube 37. The plate of the separator tube 37 is connected to and provides signals to horizontal and vertical deflection circuits 38 of the usual type.

The video filter 23, connected between the video detector 21 and the grid of the clipping tube 24, is connected to a detector load resistor 41 in which video voltages are provided by virtue of currents flowing through the detector tube 21. Intermediate frequency components of the detected signal are bypassed through the capacitances-to-ground of the tubes and filter elements. To this load resistor 41 are connected in series an automatic gain control resistor 42 and a capacitor 43, which two elements cooperate to remove vestiges of intermediate frequency from an automatic gain control bus 45 connected to the junction of the resistor 42 and the capacitor 43. This latter bus 45 provides negative control grid bias for early amplifier stages 12 and for the second amplifier tube 15. The tube 15 in connected to the automatic gain control bus through the series combination of a grid leak resistor 47, and a filter resistor 48, the junction of the resistors 47 and 48 being connected to and by-passed to ground by means of a filter capacitor 49.

In a broad sense the amplifier stages 12, 15, and 18, and the detector tube 21 may be considered to be bias-controlled amplifiers connected to and supplying signals to the clipping tube 24.

A source 51 of direct voltage supplies power for the receiver including the third intermediate frequency amplifier tube 18 and the plate or output electrode of the clipping tube 24. A resistor 52 is connected between the power source 51 and the plate and the screen grid, which are anode elements of the second amplifier tube 15. The screen of the clipping tube 24 is connected to the top of the resistor 52 through a screen dropping resistor 53. The anode of the amplifier tube 15 is connected to the top end of the resistor 52 through a portion of the bandpass filter 16. This portion serves as a load impedance for the amplifier tube 15. Thus the screen grid of the clipping tube 24 is connected through a common impedance 52 with the anode of the amplifier tube 15 to the source of voltage. Screens of both tubes are bypassed to ground by means of individual bypass capacitors 55 and 56.

The operation of the clipping tube can be understood by referring to Figure 2 in conjunction with Figure 1. If a large signal of for instance 50,000 microvolts is received at the antenna, it is amplified in the amplifier stages 12, 15 and 18 producing a large signal at the detector. The large signal at the detector 21 results in the formation of a large negative bias on the automatic gain control bus 45 which reduces the gain of the amplifiers. In the resultant equilibrium condition a larger amplitude picture signal shown at 57, coming from the bias controlled amplifier is fed into the clipper tube. For this condition the second I. F. amplifier tube 15 is biased off so that only a small current flows through this tube and through the resistor 52. This results in a high screen voltage for the second amplifier tube 15, raising the voltage of the screen dropping resistor 53 and resulting in the mutual characteristic, indicated at 58, of the clipping tube 24 having a more negative cutoff level identified by numeral 59, to accommodate the large input signal.

In comparison to the above described condition, when a smaller signal of for instance 200 microvolts is received at the antenna it is amplified producing a smaller signal 61 at the plate of the detector tube and producing a less negative bias voltage on the automatic gain control bus, resulting in high amplifier gain. Because the bias voltage on the second amplifier tube 15 is less negative than before, more current flows through the screen and plate of this tube, producing a greater voltage drop in the resistor 52 and resulting in a lower screen voltage for the clipping tube 24. A lower screen voltage results in a mutual characteristic 62 having a less negative cutoff level 63. As a result of the change in clipping level both large signals 57 and small signals 61 are clipped close to the desired level, eliminating as much as possible of undesired noise peaks identified by numeral 65, in the clipped signals shown at 67 and 68. The first clipping level must be maintained close to the level of the synchronization signals for a wide variety of received signal amplitudes.

If a source of positive direct voltage having a high internal impedance is utilized to supply direct current to both the bias controlled amplifier and the screen of the clipping tube, the resistor 52 may be omitted. However, it will then be necessary to have most of the uncontrolled portions of the set receive current either from a separate supply or from a portion of the supply having little impedance in common with the high internal impedance portion of the supply.

In Figure 3 is shown the voltage obtained when the clipped current 67 is impressed upon the video filter 26. Noise impulses identified by separate numerals occur in various parts of the desired signals, an impulse 71 occurring during the synchronizing pulse, and impulse 72 occurring in the white portion of the picture, an impulse 73 occurring in the grey portion of the picture and an impulse 74 occurring in the black portion of the picture. Because of the clipping, positive excursions due to noise do not exceed a certain positive level, so that no grid current is drawn in the video amplifier 28. If grid current were drawn in the video amplifier, the noise pulses would cause trailing white to appear in the video tube. The trailing whites if present, would cause much more visible noise in the picture than short duration blacks caused by the noise itself.

In Figure 4 is shown the voltage appearing across the load resistor 31. This resistor is effectively shunted by the tube capacitance of the clipping tube, and by the capacitance-to-ground of the coupling network 26 and the video amplifier 28. Because of this shunting effect, the voltage across this resistor contains for the most part frequencies below half a megacycle. This pass band is considerably narrower than the pass band of approximately 4 megacycles amplified by the clipper tube 24 and by the video amplifier 28. As a result of the narrow band and the integrating action, higher frequencies are removed from the voltage wave. In particular, the amplitudes of the short duration noise pulses 71—74 are considerably reduced in comparison to those in a wide band network. The reduction of these short pulses is approximately proportional to the reduction in band width.

The voltage wave of Figure 4 is coupled to the grid of the synchronization signal separator tube 37, the values of the resistors 34 and 35 and the capacitor 33 controlling the bias of the clipping tube being such that double clipping occurs within the region of the synchronization signal 75 itself. The double clipping operation which clips off and removes both positive and negative extremities of the signal, completely removes the noise impulses 71, 72, and 73 from the synchronization signals, leaving only one noise peak 74 which happened to occur in the black region of the picture.

The wave form of the synchronization signal, after being successively clipped, narrowed, and doubly clipped, is shown in Figure 5. The improvement in eliminating noise can be seen by comparing it to the signals 57 or 61 appearing at the detector.

Although a specific embodiment of the invention has been shown and described, the scope thereof is defined in the following claims.

What is claimed is:

1. In a television receiver, a wide band amplifier for video and synchronizing signals, said amplifier including a thermionic tube having an anode, a clipper circuit, a diode connected between said clipper circuit and said wide band amplifier, said clipper circuit including a thermionic tube having a screen grid, a source of voltage and a resistance connected thereto, the anode of said amplifier and the screen grid of said clipper being connected to the other end of said resistance.

2. In a television receiver having an amplifier having an output electrode and the gain thereof being controlled by a bias voltage, a clipping tube having an input electrode and a screen grid and a high impedance source of positive potential comprising a voltage source and a resistance connected in series therewith connected to provide direct current to said output electrode and to said screen grid.

3. The apparatus of claim 1, in which the connection of said screen grid to said resistance comprises a second resistance and a bypass capacitor.

4. A noise-reducing circuit for electrical signals subject to noise interference, comprising an amplifier tube for said signals and having an input electrode and an output electrode, a source of automatic gain control bias voltage connected to said input electrode, a clipper tube having a control electrode and a screen grid, a detector tube connected between said control electrode of said clipper tube and said output electrode, and a voltage source having a resistance in series therewith connected to provide current to said output electrode and to said screen grid.

5. The circuit of claim 4, in which said automatic gain control bias voltage is derived from said detector tube.

6. The circuit of claim 4, including an isolating resistance connected in series with said screen grid between said screen grid and said output electrode and first-mentioned resistance.

7. The circuit of claim 4, including a load impedance connected in series with said output electrode between said output electrode and said screen grid and first-mentioned resistance.

CLEE O. MARSH, Jr.

REFERENCES CITED

The following references are of record in the file of this patent:

UNITED STATES PATENTS

| Number | Name | Date |
|---|---|---|
| 1,687,061 | De Bellescize | Oct. 9, 1928 |
| 2,087,288 | Landon | July 20, 1937 |
| 2,178,766 | Tolson | Nov. 7, 1939 |
| 2,200,036 | Mountjoy | May 7, 1940 |
| 2,273,090 | Crosby | Feb. 17, 1942 |
| 2,304,713 | Smith | Dec. 8, 1942 |
| 2,305,842 | Case | Dec. 22, 1942 |
| 2,353,018 | Duke | July 4, 1944 |
| 2,356,141 | Applegarth | Aug. 22, 1944 |
| 2,490,025 | Bryan | Dec. 6, 1949 |